(No Model.)

F. A. REIHLEN.
TREATING SPARKLING OR EFFERVESCENT BEVERAGES.

No. 392,883. Patented Nov. 13, 1888.

WITNESSES:

INVENTOR.

Friedrich A. Reihlen

BY

Van Santvoord & Hauff

His ATTORNEYS,

UNITED STATES PATENT OFFICE.

FRIEDRICH ADOLF REIHLEN, OF STUTTGART, WÜRTEMBERG, GERMANY.

TREATING SPARKLING OR EFFERVESCENT BEVERAGES.

SPECIFICATION forming part of Letters Patent No. 392,883, dated November 13, 1888.

Application filed June 14, 1888. Serial No. 277,061. (No model.)

*To all whom it may concern:*

Be it known that I, FRIEDRICH ADOLF REIHLEN, a subject of the King of Würtemberg, residing at Stuttgart, in the Kingdom of Würtemberg and German Empire, have invented new and useful Improvements in Treating Sparkling or Effervescent Beverages, of which the following is a specification.

This invention relates to certain new and useful improvements in apparatus for treating sparkling or effervescent beverages; and it consists in the novel construction and arrangement of parts, hereinafter fully described and claimed.

Figure 1:
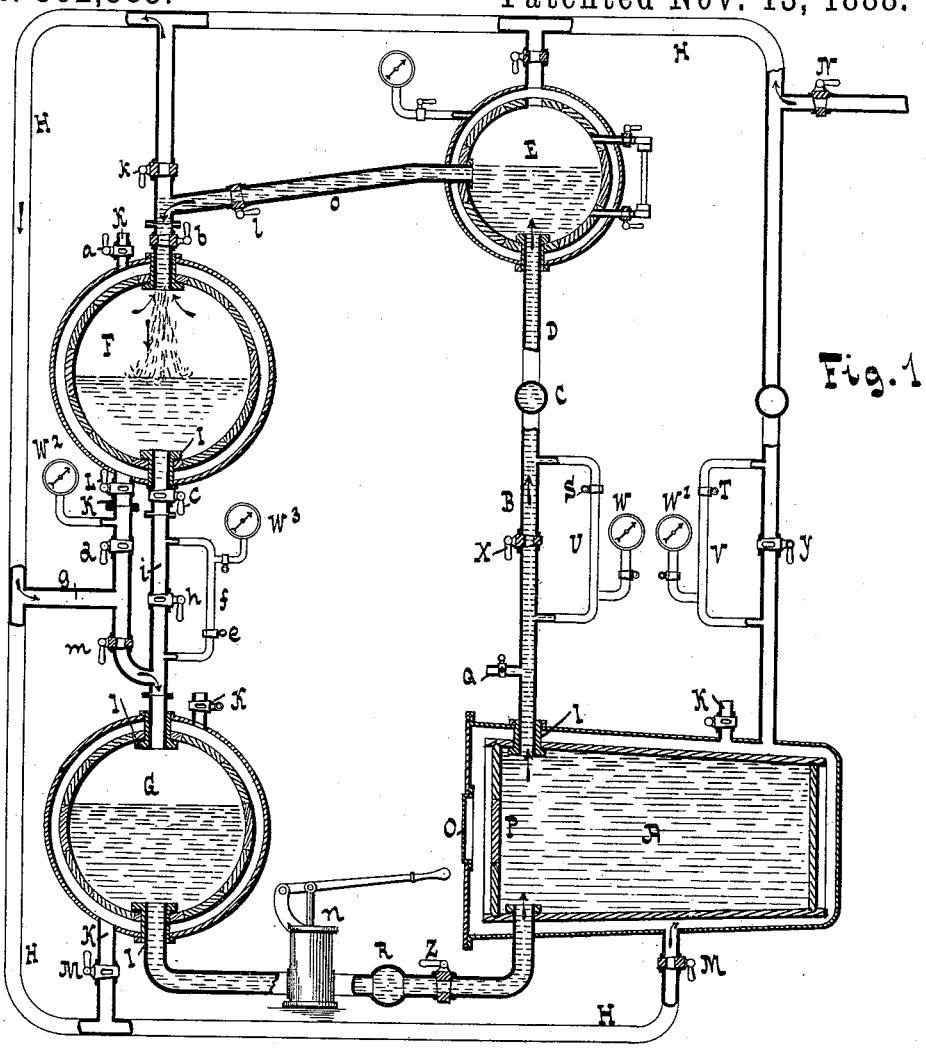
Figure 3:
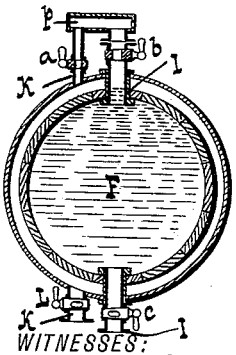
Figure 2:
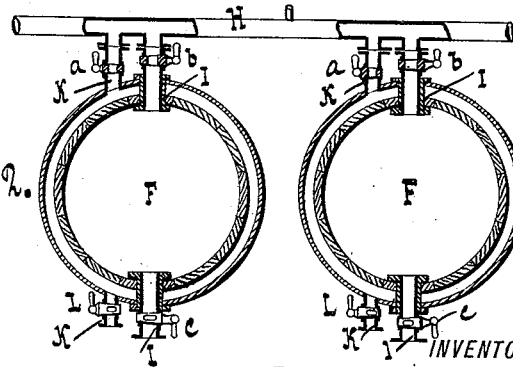

Referring to the drawings, Figure 1 is a sectional elevation of a plant for preparing sparkling drinks. Fig. 2 is a sectional view of several shipping-vessels combined. Fig. 3 shows in sectional view a shipping-vessel detached from the plant.

Similar letters indicate corresponding parts.

In carrying out this invention use is made of double-walled vessels whose inner walls consist of wood and whose outer walls consist of metal. The inner space, or the space within the inner walls, is filled with liquid, and the outer space, or the space between the two walls, is filled with carbonic acid. To maintain an equality of pressure in the two spaces during the charging and emptying of the vessels requires a special arrangement, as will be set forth.

In the drawings, the letter A indicates a generating-vessel. Instead of one generating-vessel, a series of generating-vessels communicating with one another can be employed, as will be readily understood. In the generating-vessel the raw liquor is charged with carbonic acid, either by fermentation or by the carbonic acid being forced into the liquor. From the vessel A the liquid is forced through the pipe B, the cross-pipe C, and the pipe D to the transmitting-vessel E, whence it can flow to the shipping-vessel F, in which vessel F the liquid or drink can be shipped or sent off to consumers.

The shipping-vessel F on being inserted into the plant is filled with raw liquor, which is led into the charging-vessel G before the filling of the shipping-vessel F with the complete beverage.

All the double-walled vessels are so constructed that their outer spaces can be brought into communication with the carbonic-acid conduit H, while the inner spaces, if desired, can be filled with carbonic acid. For this purpose tube-sections I K are secured to the inner and outer walls. By means of a valve, L, the carbonic acid can be admitted to the outer space of the shipping-vessel F, and by means of valves M M the carbonic acid can be admitted to the outer space of the charging-vessel G and of the generating-vessel A. In order to have constantly a sufficient supply of carbonic acid for charging the vessels, carbonic acid is supplied through the valve N from any suitable source of supply.

The description of the operation is to commence at the generating-vessel A. Supposing said vessel A to be empty and its valves all closed, then through a man-hole, O P, a suitable ferment is introduced, if thereby carbonic acid is to be generated, and the man-hole is then closed. The valve Q, the passage of which connects the inner space of the vessel A with the open air, is opened, and then through the feed-tube R raw liquor is fed until said liquor appears at the valve Q, when said valve and the valve Z are closed. The valves X Y are closed and the regulating-valves S T in the branch tubes U V on being opened bring the inner space of the vessel A into communication with the inner space of the vessel E and the outer space of the vessel A into communication with the outer space of the vessel E. The pressure in the outer and inner spaces can be noted on the manometers W W', and said pressure can be kept equal in both spaces until the required pressure—for example, eight atmospheres—has been attained. The valves X Y are then opened to establish a thoroughly free communication. If the contents of the vessel A are impregnated with carbonic acid, which can be ascertained by sampling, the valve Z is opened, thus bringing the vessel A again into communication with the feed-pipe R.

Shipping-vessels F which are to be filled with carbonic-acid drinks should have the passages I I communicating with the inner space and the passages K K communicating with the outer space. A valve, *a*, closes one of the passages K. By means of the valves *b c* L and their passages the outer space of the vessel F can be made to communicate with the carbonic-acid conduit H, and its inner space can be made to communicate with the carbonic acid and liquid. The vessel F on the start is filled with raw liquor and the vessel G with carbonic acid, at a pressure, for example, of eight atmospheres. By means of the regulating-valves $d$ $e$ and manometers $W^2$ $W^3$ of the branch tubes $f$ $g$ the pressure of the outer and inner spaces of the vessel F can be equalized, as already set forth, in connection with the vessel A. When the pressure has reached the required tension, the main valve $h$ is opened, thus causing the raw liquor in the vessel F to flow through the tube $i$ into the vessel G, and the carbonic acid in the vessel G flows into the vessel F. The valves $c$ L are then closed and the valves $b$, $k$, $l$, X, Z, and $m$ are opened while the vessel F is being filled with the beverage. The pump $n$ being put in action, the raw liquor is drawn from the vessel G into the vessel A, from which vessel A a like volume of liquor passes into the vessel E. From here the liquor flows through the tube $o$ into the vessel F, and carbonic acid escapes from the liquor through the valve $k$, the tubes H $g$, and the valve $m$ into the vessel G. If the vessel G has the same capacity as the vessel F, then upon the completion of the filling of the vessel F the vessel G will again be completely filled with carbonic acid, and a fresh vessel, F, can be introduced into the plant.

If the vessel F can be advantageously constructed from some material so as to have but one wall, then the tubes $f$ $g$ H, as also the manometer $W^2$ $W^3$, would be omitted.

In Fig. 2 is shown the combination of several shipping-vessels F by means of a carbonic-acid tube, H.

In Fig. 3 is shown a shipping-vessel F detached and ready for transportation. A connecting-tube, $p$, joining the inlets I K, can be made to preserve uniform pressure in the inner and outer spaces of the vessel F. During transportation the valve $b$ must be closed, to prevent the liquid passing out of the inner space of the vessel F.

What I claim as new, and desire to secure by Letters Patent, is—

1. The combination of the double-walled generating-vessel A, the elevated double-walled transmitting-vessel E, the elevated shipping-vessel F, the double-walled charging-vessel G, a carbonic-acid conduit, H, extending from the generating-vessel past the transmitting, shipping, and charging vessels and returned to the generating-vessel, branch tubes connecting the conduit, respectively, with the inner and outer walls of the vessels, a pipe, B, connecting the inner walls of the generating and transmitting vessels, a pipe, $o$, connecting the inner wall of the transmitting with the shipping vessel, a pipe, $i$, descending from the shipping to the charging vessel, a feed-pipe, R, leading from the lower portion of the inner wall of the charging-vessel to the inner wall of the generating-vessel, a force-pump in said feed-pipe between the charging and generating vessel for drawing the liquid from the charging-vessel, forcing it into the generating-vessel and lifting it to the transmitting-vessel, and a valve, Z, in the feed-pipe between the force-pump and the generating-vessel, substantially as described.

2. The combination of the double-walled generating-vessel A, a double-walled transmitting-vessel, E, elevated above the same, a pipe-connection between the inner walls of said vessels, a branch, U, in said pipe-connection containing a manometer, a pipe, $o$, for connecting the transmitting-vessel to an elevated shipping-vessel, a double-walled charging-vessel, G, below the transmitting-vessel and adjacent to the generating-vessel, a tube, $i$, for connecting the inner wall of the charging-vessel with the inner wall of the shipping-vessel, a branch, $f$, on said tube, containing a manometer, a carbonic-acid conduit, H, extending from the generating-vessel, passing the transmitting and charging vessels, having branches to connect with the outer walls of the transmitting and charging vessels, and returning to the generating-vessel, a branch, V, on the conduit containing a manometer, a branch, $g$, for connecting the conduit with the outer walls of the charging-vessel, with the outer wall of the shipping-vessel, and connected with a manometer, $W^2$, a feed-pipe, R, connecting the inner walls of the charging and generating vessels, and a pump, $n$, in said feed-pipe for forcing the liquid from the charging-vessel into the generating vessel and upward into the transmitting-vessel, substantially as described.

In testimony whereof I have hereunto set my hand and seal in the presence of two subscribing witnesses.

FRIEDRICH ADOLF REIHLEN. [L. S.]

Witnesses:
  LOUIS TOMMER,
  FRIEDRICH HARSCH.